US007016980B1

(12) United States Patent
Mayer et al.

(10) Patent No.: US 7,016,980 B1
(45) Date of Patent: Mar. 21, 2006

(54) METHOD AND APPARATUS FOR ANALYZING ONE OR MORE FIREWALLS

(75) Inventors: Alain Mayer, New York, NY (US); Avishai Wool, Livingston, NJ (US); Elisha Ziskind, Princeton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/483,876

(22) Filed: Jan. 18, 2000

(51) Int. Cl.
*G06F 15/16* (2006.01)

(52) U.S. Cl. .................. 709/249; 709/248; 713/201

(58) Field of Classification Search ............... 709/248, 709/249; 713/201; 370/11
See application file for complete search history.

(56) References Cited

U.S. PATENT DOCUMENTS

| | | | | |
|---|---|---|---|---|
| 5,146,560 | A | * 9/1992 | Goldberg et al. | 395/200 |
| 5,490,252 | A | * 2/1996 | Macera et al. | 395/200.1 |
| 5,726,979 | A | 3/1998 | Henderson et al. | |
| 5,898,830 | A | * 4/1999 | Wesinger, Jr. et al. | 395/187.01 |
| 5,968,176 | A | 10/1999 | Nessett et al. | |
| 6,182,226 | B1 | * 1/2001 | Reid et al. | 713/201 |
| 6,298,445 | B1 | * 10/2001 | Shostack et al. | 713/201 |
| 6,453,419 | B1 | * 9/2002 | Flint et al. | 713/201 |

FOREIGN PATENT DOCUMENTS

EP 0 854 605 A2 7/1998

OTHER PUBLICATIONS

Hinrichs et al. "Policy-Based Management: Bridging the Gap," Computer Security Applications Conference, IEEE Comput. Soc, 209-218 (Dec. 1999).

Mayer et al., "Fang: A Firewall Analysis Engine," Security and Privacy Proceedings, IEEE Symposium, 177-187 (May 2000).

* cited by examiner

*Primary Examiner*—Jack B. Harvey

(57) ABSTRACT

A method and apparatus are disclosed for analyzing the operation of one or more network gateways, such as firewalls or routers, that perform a packet filtering function in a network environment. Given a user query, the disclosed firewall analysis tool simulates the behavior of the various firewalls, taking into account the topology of the network environment, and determines which portions of the services or machines specified in the original query would manage to reach from the source to the destination. The relevant packet-filtering configuration files are collected and an internal representation of the implied security policy is derived. A graph data structure is used to represent the network topology. A gateway-zone graph permits the firewall analysis tool to determine where given packets will travel in the network, and which gateways will be encountered along those paths. In this manner, the firewall analysis tool can evaluate a query object against each rule-base object, for each gateway node in the gateway-zone graph that is encountered along each path between the source and destination. A graphical user interface is provided for receiving queries, such as whether one or more given services are permitted between one or more given machines, and providing results. A spoofing attack can be simulated by allowing the user to specify where packets are to be injected into the network, which may not be the true location of the source host-group.

29 Claims, 6 Drawing Sheets

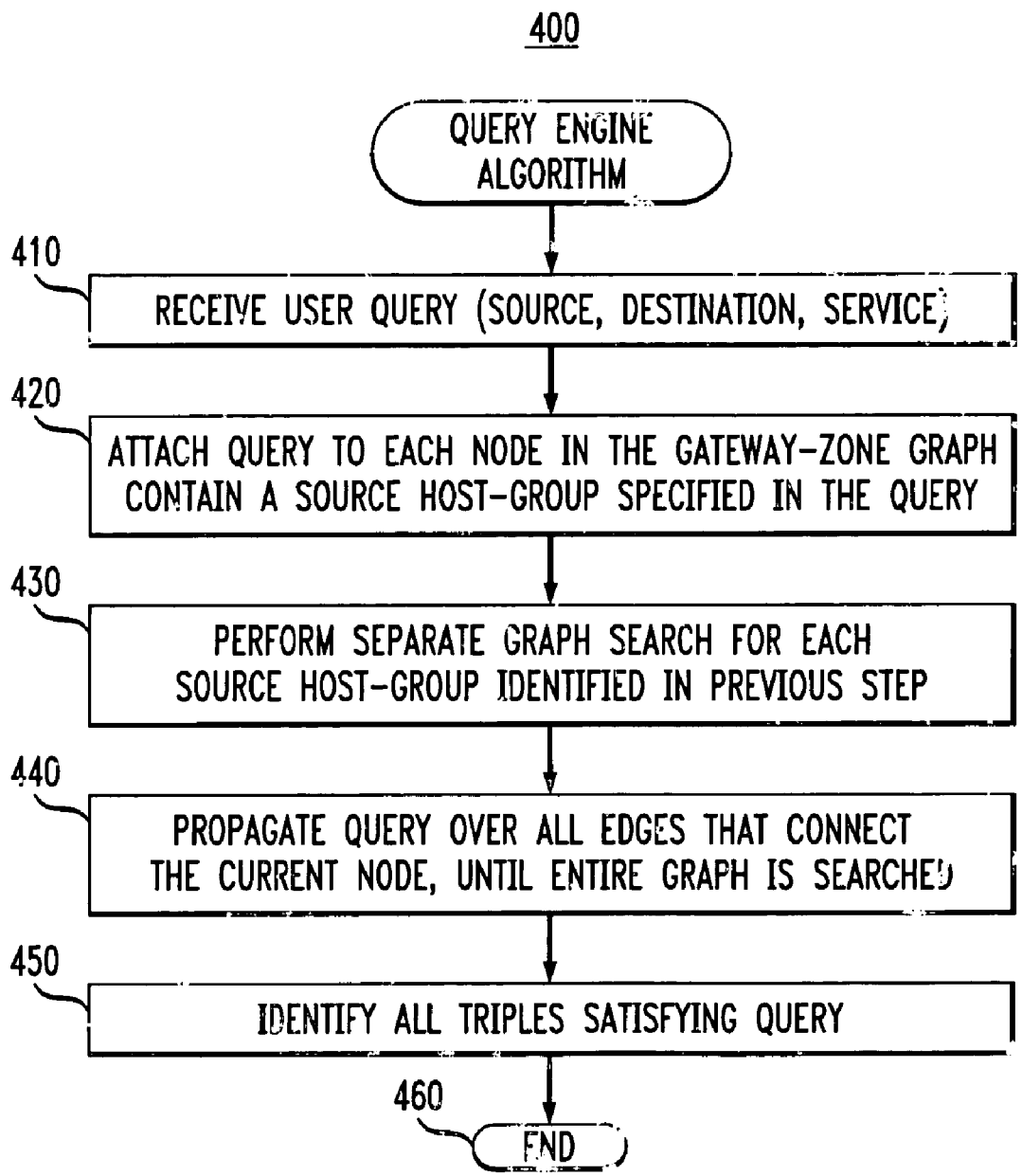

FIG. 5

| Source | Destination | Service |
|---|---|---|
| ⊞ Z_corp | multi_server | ftp |
| ⊞ Z_corp | multi_server | http_services |
| ⊞ control | dns_server | all_tcp |
| ⊞ Z_corp | dns_server | dns |
| ⊞ Z_corp | multi_server | L_corp_in/smtp |
| 111.222.2.0-111.222.2.255 | 111.222.1.17 | TCP [ 25, 0.65535] |
| ⊞ control | multi_server | all_tcp |

Dropdowns: Z_corp, Z_dmz, *

FIG. 6

| Source | Destination | Service |
|---|---|---|
| ⊞ Z_internet | dns_server | dns |
| ⊞ Z_internet | milti_server | L_dmz_in/smtp |
| ⊞ Z_internet | Z_internet | * |
| ⊞ Z_internet | milti_server | ftp |
| ⊞ Z_internet | milti_server | http_services |
| ⊞ Z_internet | L_dmz_in | * |

Dropdowns: Z_internet, *, *

FIG. 7

| Source | Destination | Service |
|---|---|---|
| ⊟ L_dmz_in | fw_admin | secure_remote_admin_to_SMS |
| 111.222.1.1 | 111.222.3.7 | TCP[ 443, 0.65535] |
| | | TCP[ 7000, 0.65535] |

METHOD AND APPARATUS FOR ANALYZING ONE OR MORE FIREWALLS

FIELD OF THE INVENTION

The present invention relates generally to firewalls, and more particularly, to a method and apparatus for analyzing the security policy of a firewall.

BACKGROUND OF THE INVENTION

Network firewalls provide important safeguards for any network connected to the Internet. Firewalls are not simple applications that can be activated "out of the box." A firewall must be configured and managed to realize an important security policy for the particular needs of a given company or entity. It has been said that the most important factor affecting the security of a firewall is the firewall configuration. While firewalls have seen impressive technical advances, there have been few, if any, advances in firewall configuration and management.

A firewall is a network gateway that filters packets and separates a proprietary corporate network, such as an Intranet, from a public network, such as the Internet. Most of today's firewalls are configured by means of a rule-base or firewall configuration file. In the case of a firewall guarding a single, homogeneous Intranet, such as the local area network (LAN) of a small company, a single rule-base instructs the firewall which inbound sessions (packets) to permit to pass, and which should be blocked. Similarly, the rule-base specifies which outbound sessions (packets) are permitted. The firewall administrator needs to implement the high-level corporate security policy using this low-level rule-base.

The firewall's configuration interface typically allows the security administrator to define various host-groups (ranges of IP addresses) and service-groups (groups of protocols and corresponding port-numbers at the hosts that form the endpoints). A single rule typically includes a source, a destination, a service-group and an appropriate action. The source and destination are host-groups, and the action is generally either an indication to "pass" or "drop" the packets of the corresponding session.

In many firewalls, the rule-base is order sensitive. In other words, the firewall checks if the first rule in the rule-base applies to a new session. If the first rule applies, the packets are either passed or dropped according to the action specified by the first rule. Otherwise, the firewall checks if the second rule applies, and so forth until a rule applies. This scheme often leads to misconfiguration due to redundant rules in the rule-base, and the desired security policy is realized only after re-ordering some of the rules.

The problems of administering a firewall are even worse for a larger company, which may use more than a single firewall. Multiple firewalls divide a company's Intranets into multiple zones, and the security policy is typically realized by multiple rule-bases, located on multiple gateways that connect the different zones to each other. Thus, the interplay between the various rule-bases must be carefully examined so as not to introduce security holes. The complexity of designing and managing the rule-bases grows, as the Intranets get more complex.

Today, even a moderately sized corporate intranet contains multiple firewalls and routers, which are all used to enforce various aspects of the global corporate security policy. Configuring these devices to work in unison is difficult, especially if the devices are made by different vendors. Even testing or reverse engineering an existing configuration, for example, when a new security administrator takes over, is hard. Firewall configuration files are written in low-level formalisms, whose readability is comparable to assembly code, and the global policy is spread over all the firewalls that are involved.

Currently, firewall administrators do not have an easy way to determine the security permissions that are applicable to various classes of machines or services in a corporate environment. Thus, it can be difficult, if not impossible, for the administrator to answer routine questions regarding the corporate security policy, such as whether one or more given services are permitted between one or more given machines. There are several reasons why evaluation of the corporate security policy can be difficult. First, packets may have multiple paths between a source and destination, with each path crossing several filtering devices. To answer a query, the administrator would need to check the rules on all of these. In addition, typical vendor configuration tools deal with a single device at a time, which may lead to inconsistent global behavior. If packet-filtering devices made by different vendors are involved, the situation quickly becomes much worse. Furthermore, even understanding the policy on a single interface of a single packet-filtering device is problematic. As previously indicated, firewall configuration languages tend to be arcane, very low level, sensitive to rule order, and highly vendor specific.

Currently, a number of vulnerability testing tools are commercially available. For example, Satan™, described, for example, in M. Freiss, Protecting Networks with SATAN, O'Reilly & Associates, Inc. (1998), attempts to exploit known flaws in widely deployed protocols and operating systems, some of which can be blocked by appropriate firewall policies. In this manner, Satan™ can be used to test the firewall policy. In addition, NetSonar 2.0™, commercially available from Cisco Systems Inc. of San Jose, Calif., connects to a corporate intranet and probes the network, thereby testing the deployed routing and firewall policies.

Currently available vulnerability testing tools are active. In other words, they send and receive packets on the network. As such, they suffer from several limitations, which if overcome, could greatly expand the utility and efficiency of such vulnerability testing tools. For example, if the intranet is large, with many thousands of machines, current vulnerability testing tools are either slow (if they test every single IP address against every possible port), or statistical (if they do random testing). Certainly, they cannot test every possible IP address on the Internet.

In addition, current vulnerability testing tools can only catch one type of firewall configuration error: allowing unauthorized packets through. They do not catch the second type of error: inadvertently blocking authorized packets. This second type of error is typically detected by a "deploy and wait for complaints" strategy, which is disruptive to the network users and may cut off critical business applications. Active testing is always after-the-fact. Detecting a problem after the new policy has been deployed, however, is (a) dangerous (since the network is vulnerable until the problem is detected and a safe policy is deployed), (b) costly (since deploying a security policy in a large network is a time consuming and error prone job), and (c) disruptive to users. Furthermore, an active tool can only test from its physical location in the network topology. A problem that is specific to a path through the network that does not involve the host on which the active tool is running will go undetected.

A need therefore exists for a firewall analysis tool that allows an administrator to discover and test a global firewall policy. A further need exists for a firewall analysis tool that uses a minimal description of the network topology, and directly parses the various vendor-specific low-level configuration files. Yet another need exists for a firewall analysis tool that interacts with the user through a query-and-answer session, which is conducted at an appropriate level of abstraction.

SUMMARY OF THE INVENTION

Generally, a method and apparatus are disclosed for analyzing the operation of one or more firewalls or other network gateways, such as routers, that perform a packet filtering function in a network environment. The security policy for a particular network environment is typically implemented by defining a packet filtering configuration file (a rule-base) for each firewall. The packet filtering configuration file instructs a given firewall whether to pass or drop certain inbound and outbound packets. Given a user query, the disclosed firewall analysis tool simulates the behavior of the various firewalls, taking into account the topology of the network environment, and determines which portions of the services or machines specified in the original query would manage to reach from the source to the destination.

The disclosed firewall analysis tool collects and reads the relevant packet filtering configuration files and builds an internal representation of the implied security policy. In addition, the firewall analysis tool utilizes a graph data structure to represent the network topology. A gateway-zone graph is comprised of a number of nodes interconnected by edges. Each node corresponds to either a gateway (firewall or router) or a zone created by a gateway. Generally, the present invention assumes that a given packet can travel along any physical path, even if not allowed according to the route scheme. The gateway-zone graph contains a node for each device containing a packet-filtering rule-base, and for each zone defined by such devices. The firewall analysis tool does not need to be aware of every router and switch in the network, and is indifferent to the routing scheme that is used.

The gateway-zone graph permits the firewall analysis tool to determine where given packets will travel in the network, and which gateways will be encountered along those paths. In this manner, the firewall analysis tool can evaluate a query object against each rule-base object, for each gateway node in the gateway-zone graph that is encountered along each path between the source and destination.

According to a further aspect of the invention, the firewall analysis tool provides a graphical user interface for receiving and evaluating simple queries, such as whether one or more given services are permitted between one or more given machines. The present invention permits a user to aggregate queries where a given service may be a set of services (up to a wildcard "all possible services"), and given machines may be arbitrary sets of IP addresses (up to a wildcard "all possible addresses"). According to a further feature of the present invention, the firewall analysis tool can simulate a spoofing attack by altering the source IP address. The firewall analysis tool allows the user to specify where the packets are to be injected into the network, which may not be the true location of the source host-group. The firewall analysis tool can also take into account firewall rules that perform network-address-translation (NAT).

A more complete understanding of the present invention, as well as further features and advantages of the present invention, will be obtained by reference to the following detailed description and drawings.

BRIEF DESCRIPTION OF THE DRAWINGS

FIG. 4 is a flow chart describing an exemplary query engine algorithm performed by the firewall analysis tool of FIG. 2; and FIGS. 5 through 7 are views of an exemplary graphical user interface used by the firewall analysis tool of FIG. 2 to receive a user query and provides results.

DETAILED DESCRIPTION

Figure 1:
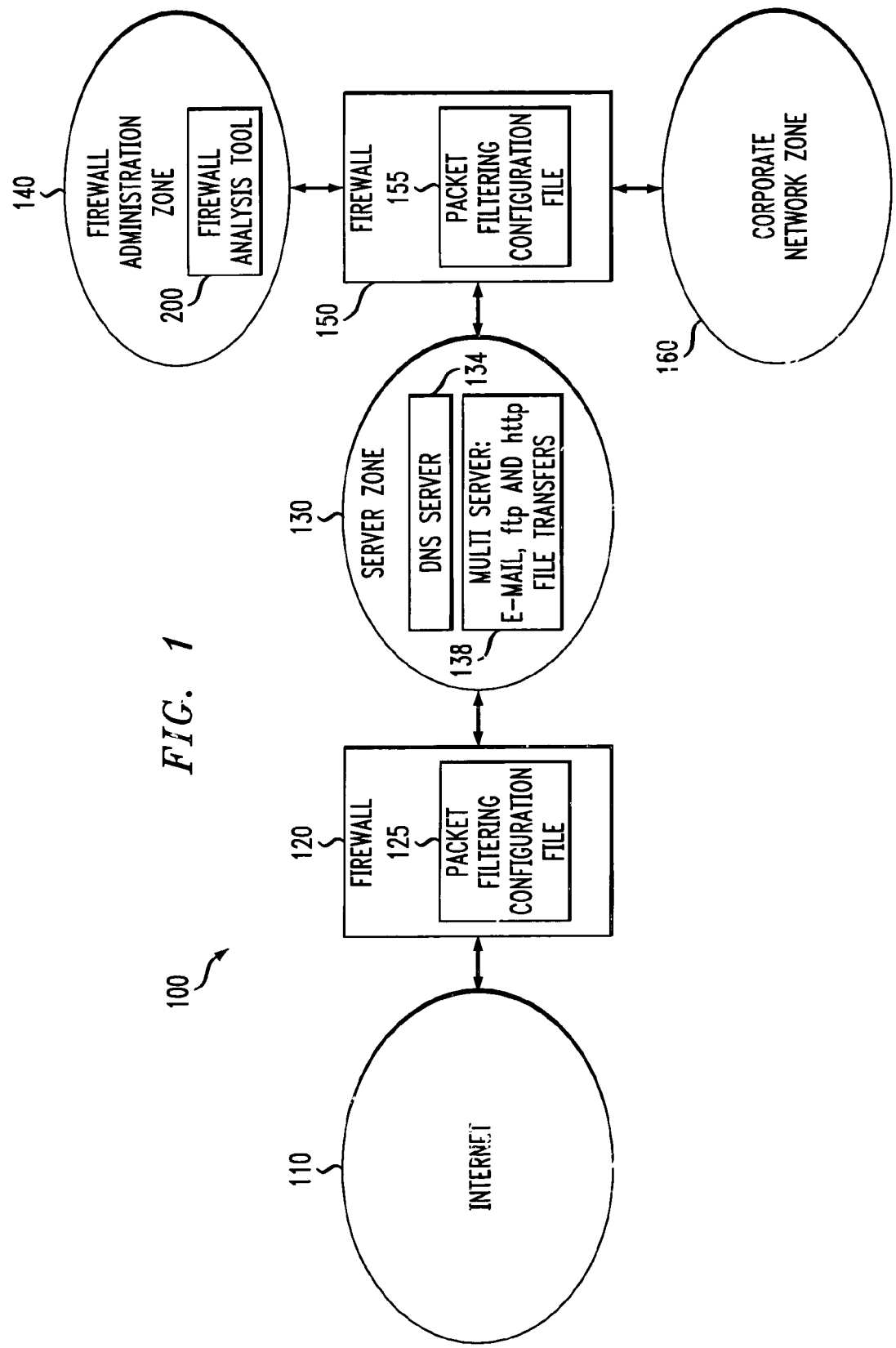
FIG. 1 illustrates a representative network environment in accordance with the present invention.

FIG. 1 illustrates a representative network environment 100 in accordance with the present invention. As shown in FIG. 1, the network 100 includes two firewalls 120, 150. The external firewall 120 guards the corporation's connection to an external network, such as the Internet 110. Behind the external firewall 120 is the server zone 130, often referred to as the "demilitarized zone" (DMZ), containing the corporation's externally visible servers. In the illustrative embodiment, the visible servers in the server zone 130 include a multiple server 138 that includes email (smtp), hypertext transfer protocol (http) file transfers (web), and file transfer protocol (ftp) file transfer services, and a domain name server (dns) 134.

Behind the server zone 130 is an internal firewall 150 that guards the corporation's proprietary or internal network, such as an Intranet. The internal firewall 150 has three interfaces. A first interface is to the server zone 130, a second interface connects the internal firewall 150 to the corporate network zone 160, and a third interface connects the internal firewall 150 to the firewall administration zone 140. Securing the firewall administration host is critical to the network's integrity and should be separated from the other corporate hosts. Within the corporate network zone there is generally one distinguished host, referred to as the control host (not shown), that provides the administration for the servers in the server zone 130. In the illustrative embodiment, each firewall 120, 150 has a packet filtering configuration file 125, 155, discussed below, associated with it.

Generally, the packet filtering configuration files 125, 155 are firewall-specific rule-bases. In the multiple firewall environment of FIG. 1, the various firewalls divide the company's intranets into multiple zones, such as the server zone (demilitarized-zone—DMZ) 130, the firewall administration zone 140 and the corporate network zone 160. In this case, the security policy is typically realized by multiple rule-bases, located on the various gateways. Thus, the interplay between these rule-bases determines which sessions will be allowed through.

The illustrative corporate network environment of FIG. 1 employs a security policy that provides unrestricted access to the trusted internal corporate users, whereas external users are allowed to access only content that is explicitly made publicly available. Specifically, the security policy allows internal corporate hosts to access all the resources on the Internet. External hosts, however, can only access the servers in the server zone 130. In particular, smtp services to corporate users are only allowed via the mail server 138, and dns services are provided to the Internet only by the dns server 134. In addition, the servers 134, 138 can be updated only by the web administrator host, control, (not shown), that provides the administration for the servers in the server zone 130. Other corporate users have the same privileges as Internet hosts with respect to the DMZ servers 134, 138. Finally, the firewall interfaces 120, 150 are only accessible from the firewall administrator host 140.

As shown in FIG. 1, the present invention provides a firewall analysis tool 200 that collects and reads all the relevant packet filtering configuration files 125, 155, and builds an internal representation of the implied security policy and network topology, as discussed further below. The firewall analysis tool 200 provides a graphical user interface for evaluating simple queries, such as whether one or more given services are permitted between one or more given machines. A user can aggregate queries where a given service may be a set of services (up to a wildcard "all possible services"), and given machines may be arbitrary sets of IP addresses (up to a wildcard "all possible addresses"). Given a query, the firewall analysis tool 200 simulates the behavior of the various firewalls 120, 150, taking into account the topology of the network environment 100, and computes which portions of the services or machines specified in the original query would manage to reach from the source to the destination. Thus, the firewall analysis tool 200 determines whether only a subset of the services is allowed, or whether such allowed services are permitted only between subsets of the specified source and destination host-groups.

According to a further feature of the present invention, the firewall analysis tool 200 can simulate spoofing attacks that alter the source IP address. The firewall analysis tool 200 allows the user to specify where the packets are to be injected into the network, which may not be the true location of the source host-group. The firewall analysis tool 200 can also take into account firewall rules that perform network-address-translation (NAT).

Firewall Terminology and Modeling Concepts Typically, a firewall configuration tool allows the security administrator to define various host-groups (collections of IP addresses) and service-groups (groups of protocols and corresponding port-numbers at the hosts which form the endpoints). A single rule typically includes a source, a destination, a service-group, and an appropriate action. The source and destination are host-groups, and the action is typically to either "pass" or "drop" the packets of the corresponding session. In addition, the action may specify the writing of a log record or the performance of a network-address-translation (NAT).

As previously indicated, the rule-base is often order-sensitive. Generally, the firewall checks if the first rule in the rule-base applies to a new session. If so, the packets are either dropped or permitted to pass according to the action of the first rule. Otherwise, the firewall checks if the second rule applies, and so forth.

As used herein, gateways are the packet filtering machines and can be either firewalls or routers. Normally, a gateway is multi-homed, since a gateway has at least two Internet connections. Typically, a gateway has multiple network connections. Each connection goes through an interface, which has its own unique IP address. It is assumed that each interface has a packet filtering configuration file 125, 155 associated with it. The gateways partition the IP address space into disjoint zones, as shown in FIG. 1. Precisely, a zone, z, is a maximal set of IP addresses such that packets sent between any two addresses in z do not pass through any filtering gateway. Most zones correspond to a corporation's subnet(s), usually with one big "Internet" zone 110 corresponding to the portion of the IP address space that is not used by the corporation.

A service is the combination of a protocol-base, such as tcp or udp, and the port numbers on both the source and destination sides. For example, the service telnet is defined as tcp with destination port 23 and any source port. A service-group is simply a set of services.

Firewall Analysis Tool

Figure 2:
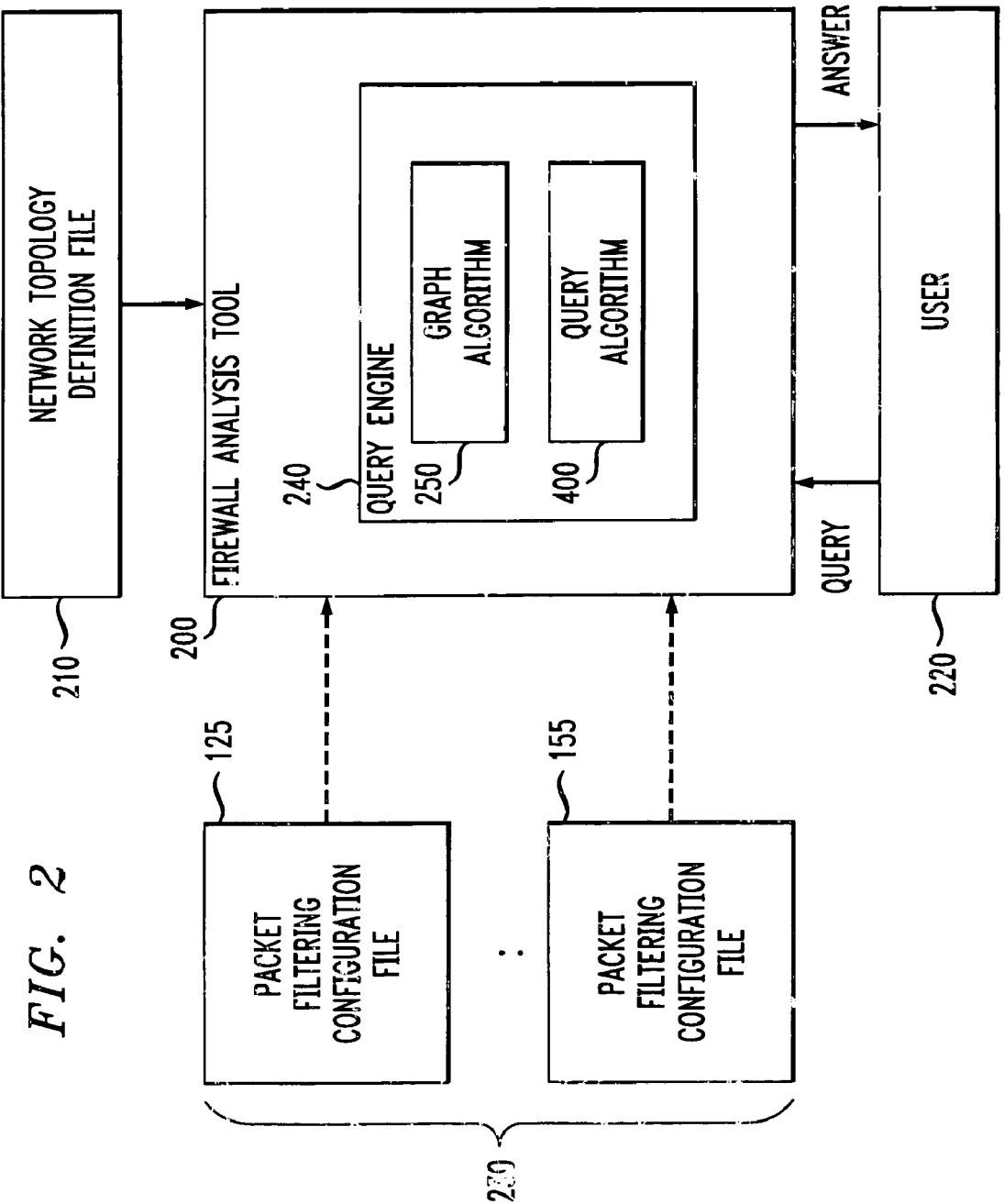
FIG. 2 illustrates the components of the firewall analysis tool of FIG. 1.

As shown in FIG. 2, the firewall analysis tool 200 requires an instantiated model of the network topology, as described in a user-written topology definition file 210, discussed further below in the section entitled "Topology File." As shown in FIG. 2, the topology definition file 210 is written using a subset of the model definition language (MDL), discussed below in a section entitled "Model Definition Language (MDL)."

Figure 3:
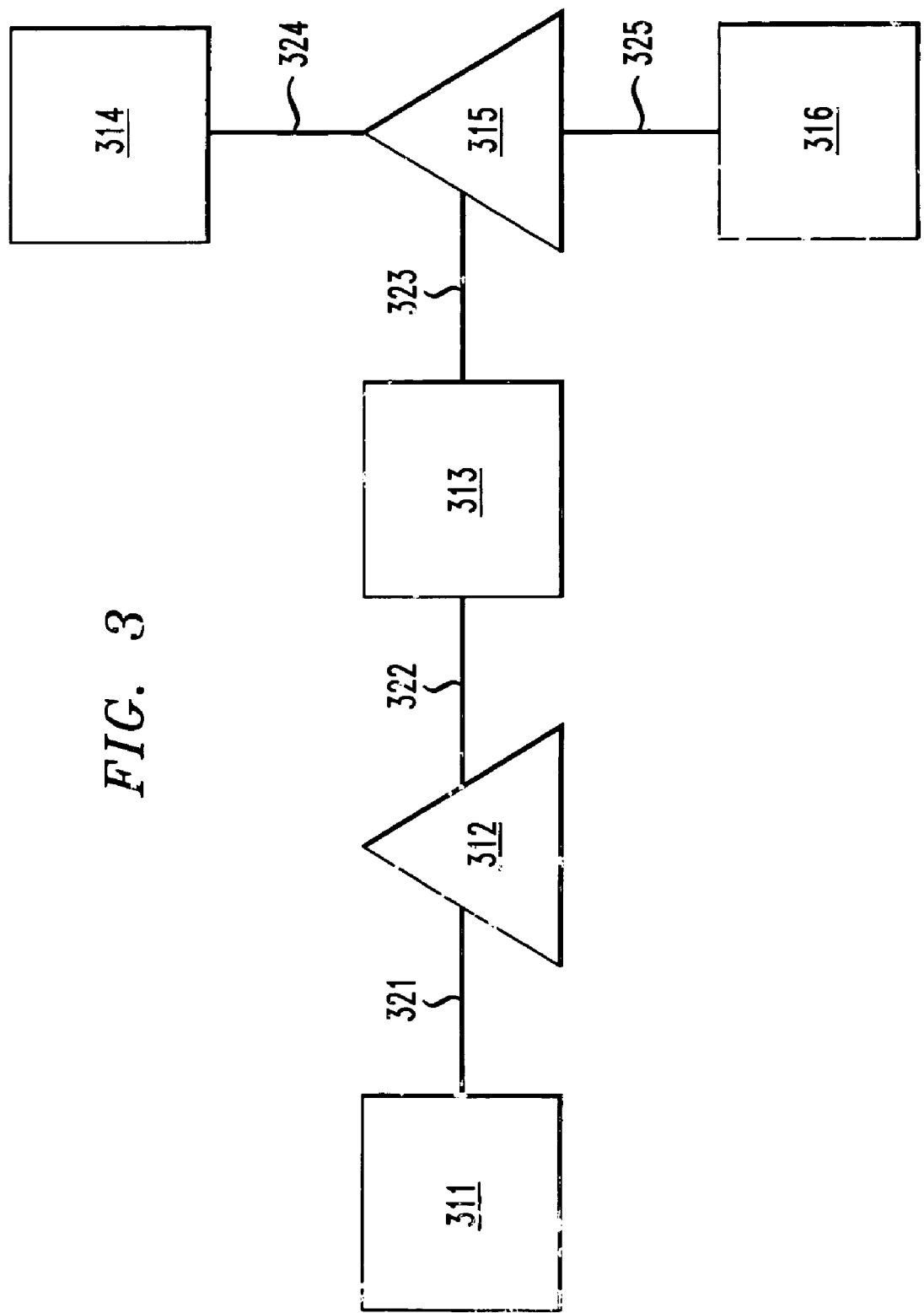
FIG. 3 illustrates a gateway-zone graph of the network environment of FIG. 1.

As shown in FIG. 2, the query engine 240 of the firewall analysis tool 200 uses a combination of a graph data structure discussed below in conjunction with FIG. 3 and a rule-base simulator contained in a query algorithm 400, discussed below in conjunction with FIG. 4. As shown in FIG. 2, the query engine 240 takes as input a query from a user 220 consisting of a source and destination (both of which are host-groups) and a service group.

According to one feature of the present invention, the firewall analysis tool 200 does not need to be aware of every router and switch in the network, and is indifferent to the routing scheme that is used. Generally, the present invention assumes that a given packet can travel along any physical path, even if not allowed according to the route scheme. The present invention considers those devices that have packet-filtering rule-bases installed on them, and the zones these devices define. At this level of granularity, the topology is quite stable. Thus, the topology file 210 only needs to be modified if firewalls 120, 150 are added or replaced in the network 100.

As part of the topology definition file 210, the user 220 specifies the names of the packet filtering configuration files 125, 155 (hereinafter, collectively referred to as firewall configuration files 230) that contain the rule-bases for all of the gateway interfaces 120, 150 in the network environment 100. After reading the topology definition file 210, the firewall analysis tool 200 parses each of these configuration files 230 in turn (using a separate "front-end" module for each supported firewall variation), and populates its internal rule-base data structures for each device. It is again noted that these firewall configuration files 230 are vendor-specific, and are created by whatever tools are used to configure the devices in question.

The user forms a query by choosing each element of the query triple (service, source, destination), for example, from a drop-down menu offering the choice of all the host-groups or service-groups that were defined in the configuration files.

Topology Modeling

The network topology is modeled by partitioning the network 100 into zones 130, 140, 160, which are connected through gateways. A gateway 120, 150 has an interface for each adjacent zone 130, 140, 160. Each interface either has its own IP address (and is considered a host for some purposes), or is declared to be invisible (for example, using an INVIS keyword) if the firewall 120, 150 operates as a bridge. Packets leaving and entering a zone 130, 140, 160 can be filtered by the gateway 120, 150 on the corresponding interface. Packets sent and received within the same zone 130, 140, 160 cannot be filtered by a gateway 120, 150, simply because the packets do not pass through any gateway 120, 150. Therefore, from the perspective of the firewall analysis tool 200, there exists a path between any two hosts in the same zone, with any and all filtering being performed by the interfaces. Zones consist of host-groups. Host-groups are typically further subdivided into a hierarchy of smaller host-groups or single hosts.

Topology File

In this section we give a complete listing of the topology file, written in MDL, used to describe the network environment 100. The topology file provides an input mechanism for building the gateway-zone graph 300, discussed further below. First, the host-groups are defined.

```
HOST_GROUPS {
    # the zones
    Z_dmz     = [111.222.1.0/24]
    Z_corp    = [111.222.2.0/24]
    Z_admin   = [111.222.3.0/24]
    Z_internet = [0.0.0.0      - 111.221.255.255,
        111.222.100.0 - 255.255.255.255]
    # the (visible) gateway interfaces
    I_dmz_in     = [111.222.1.1]
    I_admin      = [111.222.3.1]
}
```

It is noted that an IP address range can be specified in different ways. The slash notation defines a range by indicating how many of the most significant bits are fixed.

Next, the interfaces are defined.

```
INTERFACES {
    I_internet_dmz = {INVIS, NO_GEN}
    I_dmz_in      = {file="~/fw/analyzer/data/dmz_in"}
    I_dmz_corp    = {INVIS, NO_GEN}
    I_corp_in     = {INVIS,
        file="~/fw/analyzer/data/corp_in"}
    I_admin       = {file="~/fw/analyzer/data/admin"}
}
```

Interfaces with the NO_GEN attribute do not perform any filtering. Interfaces with the INVIS attribute do not have an IP address since they belong to a firewall that works as a bridge.

Finally, the gateways and zones are defined.

```
GATEWAYS {
    dmz_gw = {I_internet_dmz, I_dmz_in}   : LMF
    corp_gw = {I_dmz_corp, I_corp_in, I_admin} : LMF
}
ZONES {
    Z_internet = {I_internet_dmz}
    Z_dmz      = {I_dmz_in, I_dmz_corp}
    Z_corp     = {I_corp_in}
    Z_admin    = {I_admin}
}
```

Naming In the model used by the present invention, all the objects (hosts, host-groups, service-groups) generally have names. This provides a high level of abstraction when interacting with the user. Meaningful names are more expressive than raw IP addresses and port numbers. To the extent possible, the firewall analysis tool 200 obtains these names from the vendor-specific configuration files. However, since each device and interface is assumed to have been configured independently, there may be name conflicts. For example, the administrator may have defined the name http to signify tcp on port 80 on one gateway, while on another gateway the administrator may use the same name to mean tcp on ports 80, 8000, and 8080. To support this level of naming, the firewall analysis tool 200 maintains a separate symbol table context per interface (i.e., per rule-base). If the same name appears in different contexts with different meanings, the firewall analysis tool 200 can optionally show all the variants in its drop-down menus, prefixed with the interface name. Otherwise, if all the variants are identical, the name will appear only once with no prefix.

Rule-Bases

The implicit security policy in place within the corporate network environment 100 is derived from the vendor specific packet filtering configuration files 125, 155. The firewall analysis tool 200 transforms each of these packet filtering configuration files 125, 155, associated with an interface, into a table of logical rules containing the following record structure (simplified for ease of explanation):

```
struct rule {
    struct hostgrp       *source;
```

```
    struct hostgrp       *dest;
    struct servicegrp    *service_grp;
    direction_ty         direction;
    action_ty            action;
};
```

The actual semantics differ among different vendors. In the illustrative embodiment, the following exemplary semantics are utilized. When packets are filtered, the rules in the list are examined in their order until a match occurs. The source, destination and service_grp fields are compared to the corresponding fields in the packet. The direction specifies whether the rule applies to packets entering (IN) or leaving (OUT) the gateway 120, 150 on which this interface sits (i.e., the rules are gateway-centric). The wildcard direction (BOTH) indicates that the rule applies to both directions. If a match occurs, the corresponding action (DROP or PASS) is performed. The internal rule-base table also supports rules that perform NAT, and hence, the rule structure has some additional fields.

Queries

A central object in the firewall analysis tool 200 is a query. A query is a triple, consisting of a source host-group, a destination host-group, and a service group. The semantics of such a query are "which IP addresses within the source host-group can send services from the service-group to which IP addresses in the destination host-group?" The query is described by the following data structure:

```
struct query {
    struct hostgrp *src;
    struct hostgrp *dst;
    struct servicegrp *service;
};
```

It is again noted that host-groups and service-groups may be wildcards, i.e., any element of the query triple can be the "*" wildcard, meaning "any." So the question "which machines can use the company's web-servers?" can be expressed by the query triple having the form (*, web_servers, http_services), assuming that the host-group web_servers and the service-group http_services are defined.

Typically, not all the packets described by a query can reach the destination. Through the operations of the various rule-bases 125, 155, some packets may be dropped. Therefore, the firewall analysis tool 200 will answer such a query with a refined list of "sub-queries", i.e., a list of query triples where each element is a subset of the corresponding element in the query triple.

The semantics of the answer are that for each subset triple, the corresponding source host-group can indeed send the service to the destination host-group.

Gateway-Zone Graph

The firewall analysis tool 200 utilizes a graph data structure, to represent the network topology. FIG. 3 illustrates a gateway-zone graph 300 for the network environment of FIG. 1. The gateway-zone graph 300 is comprised of a number of nodes 311–316 interconnected by edges 321–325. For a detailed discussion of the generation of gateway-zone graphs 300 in accordance with graph-theoretical principles, see, for example, T. H. Cormen et al., Introduction to Algorithms, 463–630 (MIT Press, 1989), incorporated by reference herein. The exemplary gateway-zone graph 300 shown in FIG. 3 utilizes the following standard notation. The triangle symbol "A" indicates a gateway 120, 150 in the network 100, and the rectangle symbol "□" indicates a zone 110, 130, 140 160 in the network 100. There is an edge 321–325 between two nodes 311–316 if there is a physical connection between them. Generally, the gateway-zone graph 300 permits the firewall analysis tool 200 to determine where given packets will travel in the network 100, and which gateways 120, 150 will be encountered along those paths.

For this purpose, the internal model contains the following auxiliary graph. As used herein, the gateway-zone graph 300 is defined as a bi-partite graph H=((G ∪ Z), I) whose vertices consist of the set of gateways G and the set of zones Z. The set of interfaces I forms the edges: H contains an edge i=(g,z) connecting a gateway g ∈ G to a zone z ∈ Z, if and only if g has an interface i whose adjacent-zone is z.

The vertices of the gateway-zone graph 300 are implemented using the following structure:

```
struct node {
    union {
        struct zone *z;
        struct gateway *gw;
    } zg;
    struct hostgrp *hg;
    node_ty type;
    struct query *q;
};
```

There is a node for each gateway and zone. The type field indicates whether a gateway or zone is represented by a given node. The hg field keeps the IP range contained in the node. For zone nodes, hg is the host-group of the zone minus the IP addresses of the interfaces adjacent to this zone. For gateway nodes, hg is the set of IP addresses of the interfaces attached to the gateway. The q field in the node structure is used for processing the query, as discussed below.

Query Engine Algorithm

The query engine of the firewall analysis tool 200 uses a combination of the graph data structure discussed above in conjunction with FIG. 3 and a rule-base simulator contained in a query algorithm 400, discussed below in conjunction with FIG. 4. As shown in FIG. 2, the query engine 240 takes as input a query from a user 220 consisting of a source and destination (both of which are host-groups) and a service group. It then simulates the behavior of all the packets described by the query as they traverse the network.

FIG. 4 is a flow chart describing an exemplary query engine algorithm 400 performed by the firewall analysis tool of FIG. 2. As shown in FIG. 4, a user query is received during step 410 and the query is initially attached to the node in the gateway-zone graph which contains the source host-group during step 420. If the source host-group is not contained in a single zone, for example, when the wildcard, *, is used, the source host-group is broken up into disjoint host-groups during step 420, each of which is contained in a zone. A separate graph search is then performed during step 430 for each source host-group. Generally, the graph search evaluates the query object against each rule-base object, discussed above, for each gateway node in the gateway-zone graph 300 that is encountered in the graph search.

Then, the algorithm attempts to propagate the query over all the edges that connect the current node during step 440. The algorithm continues in the same manner, propagating the query further until it searches the entire graph. All triples satisfying the query are identified during step 450 before program control terminates during step 460.

The basic step of the algorithm 400 is propagating a query over an edge in the gateway-zone graph 300, which represents a firewall interface. This models the effect of the rule-base that is attached to the interface on the packets described by the query. Typically, only portions of the query can cross any given edge, since some of the packets would be dropped by the interface. Therefore, after crossing an edge, the query may need to be broken up into a set of more refined queries, that represent only those packets that would have been allowed through. For instance, the original query may have been (corporate_net, internet, *), but the rule-base only allows outgoing http and smtp services so the set of queries that reaches the other side of the edge is now (corporate_net, internet, tcp), (corporate_net, internet, smtp).

It is noted that some nodes may be visited more than once, while other nodes will not be visited at all, since the algorithm 400 backtracks over all possible paths the query can take through the network 100, and continues as long as some portion of the query remains un-dropped. If the query can reach a node v (whether a zone or a gateway) via different paths, the new query that is attached to v is the union of the query results reaching v on each of the possible paths. In one variation, the search can be optimized to not perform a traversal if it is clear that no new packets will be allowed through that have not been already by other paths.

The final stage in processing a query is to collect the results during step 450. This simply involves looking at the node or nodes that contain the destination host-group and picking out those queries that have reached their correct destination.

In the worst case, the complexity of the algorithm 400 is exponential in the size of the gateway-zone graph 300. However, this worst case can only occur in very dense graphs. Typical gateway-zone graphs 300 are very sparse, since firewalls 120, 150 are normally placed at strategic choke points in the network, and the most common case gateway-zone graph topology is a tree. On a tree topology, the algorithm is essentially a depth-first-search, i.e., it is linear in the size of the graph. Furthermore, since only zones that are separated by firewalls are modeled, the gateway-zone graphs tend to be quite small.

Spoofing

A small extension to the basic algorithm 400 allows testing for spoofing attacks. In addition to the source, destination and service parameters that define a query, an optional fourth parameter is added which specifies the true source from which the packets originate. When this fourth parameter is defined, the original source host-group is then understood to be the fake source address in the packet. The query can then be processed in the manner described above, except that instead of starting from the nodes that contain the fake source host-group, the algorithm starts at those nodes that contain the true source.

EXAMPLE

Consider the query: "What services are allowed between the corporate zone and the DMZ?" The results, shown in FIG. 5, reflect that the firewall configuration was done correctly in this regard. The services are available to all the hosts in the corporate zone, but only control can open any tcp connection to the servers. In addition, note that only the names of the host and service groups are displayed, but more detail (like actual IP address and port numbers) are available by expanding an entry (optionally via a mouse-click).

In another example, consider the query: "How much access does the Internet 110 have to the internal network 130, 140, 150?" The results are shown in FIG. 6. The first five lines of the results show that any host on the Internet 110 has some restricted access to the servers on the DMZ 130. Furthermore, from the point of view of the firewall analysis tool 200, any host in the Internet zone 110 can speak to any other host in that zone 110, which explains the third line. The last line, however, indicates a weakness in the implementation of the security policy. This line indicates that any host on the Internet 110 can potentially open any service with the inner interface of the external gateway. Examination of the topology file will reveal the problem: The outer interface, I_internet_dmz, does not perform any filtering, and once packets have entered the gateway through it, they can speak to the other interface without any filtering. A more prudent approach, that solves this vulnerability, is to attach the rule-base to the outer interface rather than to the internal one.

Another example illustrates how to check for spoofing. The most sensitive host is probably the firewall administrator 140, so no Internet host should be able to reach it, even with spoofing. To do this, the real source is set to be the Internet zone 110, and the given source (the spoofed address) is arbitrary. The results are shown in FIG. 7. The leak that they indicate, is actually a result of the same problem seen in the previous query. An Internet host can create a message with the source address of the I_dmz_in interface. No filtering is done on the outer interface, and once inside, the packet is considered as if it originated from the I_dmz_in interface itself and will be let through because it matches one of the rules.

In a further extension of the query-answer mechanism of the present invention, additional information about a query is provided. For example, the query results can indicate which rule in which interface is responsible for passing or dropping a particular packet. Such information can displayed graphically to show the path packets take from source to destination. Another extension is to enhance the firewall analysis tool 200 to enable topology independent queries via, e.g., defining zones as being "internal" or "external." If the firewall analysis tool 200 can read in queries from a file, the user would then be in a position to use expert-generated queries to test the network for some basic insecurities. The expert queries might cover well-known insecure ports or services and test accessibility of such ports from the external zones. As new vulnerabilities become known, organizations such as CERT could make updated query files available on their web-site for downloading.

Model Definition Language (MDL)

As described in U.S. patent application Ser. No. 09/240, 934, filed Jan. 29, 1999, assigned to the assignee of the present invention and incorporated by reference herein, a model definition language (MDL) is used to instantiate the security policy, and to map the policy onto the topology. A parser translates an MDL program into an instance of the entity-relationship model. The model is expressed by a corresponding data structure.

MDL for Security Policy Description

A service is defined by means of a statement in the form: <service-name>=<protocol-base>[<dest-port-no-range>, <src-port-no-range>].

For example, the following code fragment defines the widely used services smtp, ssh, ping, https and a service denoting all tcp-based packets:

| SERVICES { | |
|---|---|
| smtp = | TCP [25] |
| ssh = | TCP [22] |
| ping = | ICMP [8,0] |
| https = | TCP [443] |
| all_tcp = | TCP [*] |
| } | |

Services can be grouped into a service-group, ServiceGrp, by a statement of the following form:

<srv-grp-name>={<service-name 1>, <service-name2> ... }

The following code fragment defines the two service-groups, admin-to-gtwy and gtwy-to-admin:

SERVICE_GROUPS {
        admin-to-gtwy={ssh, ping}
        gtwy-to-admin={ssh, https}

A role is defined by a statement of the following form, where the arrow defines the direction attribute in an obvious way, the role-grp-name points to peers, and the srv-grp-name points to a service-group:

<role-name> arrow <role(-grp)-name>: <srv-grp-name> arrow=↑∥→∥↔

The following code fragment defines the roles mail_server and internal_mail_server, discussed above. The roles gateway-in and gateway-out model the capabilities of gateway interfaces in each direction. This example is continued in the next code fragment:

```
ROLE_DEFINITIONS {
    mail_server ↔ * :smtp
    internal_mail_server ↔ mail_server :smtp
    gateway_in ← fw_admin : admin_to_gtwy
    gateway_out → fw_admin : gtwy_to_admin
    intranet_machine → all_tcp : *
}
```

Roles are grouped into open (by default) role-groups 325 by the following statement:

<role-grp-name>={<role-name1>, <role-name2> . . . }

Roles are grouped into closed role-groups by the following statement:

<role-grp-name>=<<<role-name1>, <role-name2> . . . >.

The following code fragment defines the role-group, gateway, bundling the unidirectional gateway roles into one role-group. It is noted that the gateway role-group is closed, thus effectively "stealthing" hosts which assume this role-group.

```
ROLE_GROUPS {
    gateway=<<gateway_in, gateway_out>># a closed
        group
```

MDL for Topology Description and Policy Mapping

Hosts and host-groups are defined by the following statements:

<host-name>=[<IP-Addr>]: <role-grp-name>

<host-grp-name>=[<IP-Range>]: <role-grp-name>

The following code fragment defines the hosts, dirty (presumably outside the intranet) and dusty, assigning them roles of external and internal mail servers, respectively:

```
HOST {
    dirty =    [111.222.100.6]         : mail_server
    dusty =    [111.222.1.3]:          internal_mail_server
}
```

Gateways are defined by the following statement:

<gateway-name>={<host-name1>, <host-name2> . . . }

The following code fragment defines payroll_gw_interface1/2 as hosts and specifies their IP-addresses, and then defines the gateway payroll_gw as having payroll_gw_interface1/2 as its two interfaces. The code fragment also assigns the role-group, gateway, to the interfaces.

```
HOST {
    payroll_gw_interface1 = [111.222.26.226] : gateway
    payroll_gw_interface2 = [111.222.24.210] : gateway
}
GATEWAYS {
    payroll_gw = {payroll_gw_interface1, payroll_gw_interface2}
}
```

Zones are defined by means of the following statement:

<zone-name>: {<gtwy-interface-name1>, <gtwy-interface-name2> . . . }

The following code fragment first defines the zones payroll_zone and corp_zone (parts of the intranet manhattan_office) as host-groups, specifies their IP-ranges and then defines parts of the network topology by specifying the payroll_zone to be connected to the payroll_gw by means of the payroll_gw_interface1, and the second interface of the payroll_gw to be connected to the corp_zone.

```
HOST-GROUPS {
    manhattan_office    = [111.222.0.0–111.222.255.255] : intranet_machine
    payroll_zone        = [111.222.26.0–111.222.26.255] : payroll_machine
    corp_zone           = [111.222.24.0–111.222.24.255] : non_payroll_machine
}
ZONES {
    payroll_zone    = {payroll_gw_interface1 }
    corp_zone       = { payroll_gw_interface2, ...}
}
```

It is to be understood that the embodiments and variations shown and described herein are merely illustrative of the principles of this invention and that various modifications may be implemented by those skilled in the art without departing from the scope and spirit of the invention.

We claim:

1. A method for analyzing at least one gateway in a network, said at least one gateway having a packet filtering configuration file including a plurality of rules, said network having a plurality of addresses, said method comprising the steps of:

generating a gateway-zone graph that models said network based on said packet filtering configuration file, said gateway-zone graph having at least one gateway node corresponding to said at least one gateway and at least two zone nodes, wherein said at least one gateway is a packet filtering machine and each of said zone nodes correspond to a partitioned collection of said addresses created by said at least one gateway;

receiving a query inquiring whether one or more given services are permitted between at least one source address and at least one destination address; and evaluating said query against each of said rules associated with each gateway node in said gateway-zone graph that is encountered between said at least one source address and said at least one destination address.

2. The method of claim 1, wherein said rules are expressed as rule-base objects.

3. The method of claim 1, wherein said gateway-zone graph is derived from a network topology file.

4. The method of claim 1, wherein said query includes a wildcard for at least one of said service, source address or destination address.

5. The method of claim 1, further comprising the step of determining a portion of said one or more given services that are permitted between at least one source address and at least one destination address.

6. The method of claim 1, further comprising the step of transforming said packet filtering configuration files into a table of logical rules that are processed during said evaluating step.

7. The method of claim 1, wherein said query consists of a source host-group, a destination host-group, and a service host-group.

8. The method of claim 1, wherein said query specifies a location where packets are to be inserted into the network that is different from a source address.

9. A method of modeling a network having a plurality of gateway devices, comprising the steps of:
 identifying each gateway device in said network having a packet-filtering rule-base and each zone in said network defined by said gateway devices; and
 generating a gateway-zone graph that models said network based on said packet-filtering rule-base, said gateway-zone graph having a gateway node corresponding to each of said gateway devices and a zone node corresponding to each of said zones.

10. The method of claim 9, wherein said gateway-zone graph is derived from a network topology file.

11. The method of claim 9, further comprising the step of transforming said packet-filtering rule-base into a table of logical rules.

12. An apparatus for analyzing at least one gateway in a network, said at least one gateway having a packet filtering configuration file including a plurality of packet filtering rules, said network having a plurality of addresses, said tool comprising:
 a user interface for receiving a query inquiring whether one or more given services are permitted between at least one source address and at least one destination address, wherein each of said source addresses and said destination addresses correspond to one of said zones; and
 a user interface for indicating a portion of said one or more given services that are permitted between a portion of said at least one source address and a portion of said at least one destination address, said portions obtained by analyzing a gateway-zone graph that models said network based on said packet filtering configuration file with at least one gateway node corresponding to said at least one gateway and at least two zone nodes, wherein each of said zone nodes correspond to a partitioned collection of said addresses created by said at least one gateway.

13. The method of claim 12, wherein said rules are expressed as rule-base objects.

14. The method of claim 12, wherein said gateway-zone graph is derived from a network topology file.

15. The method of claim 12, wherein said query includes a wildcard for at least one of said service, source address or destination address.

16. The method of claim 12, wherein said packet filtering configuration files are expressed as a set of logical rules.

17. The method of claim 12, wherein said query consists of a source host-group, a destination host-group, and a service host-group.

18. The method of claim 12, wherein said user interface allows a user to specify a location where packets are to be inserted into the network that is different from a source address.

19. An apparatus for analyzing at least one gateway in a network, said at least one gateway having a packet filtering configuration file including a plurality of rules, said network having a plurality of addresses, said tool comprising:
 a memory for storing computer readable code; and
 a processor operatively coupled to said memory, said processor configured to:
 generate a gateway-zone graph that models said network based on said packet filtering configuration file, said gateway-zone graph having at least one gateway node corresponding to said at least one gateway and at least two zone nodes, wherein said at least one gateway is a packet filtering machine and each of said zone nodes correspond to a partitioned collection of said addresses created by said at least one gateway;
 receive a query inquiring whether one or more given services are permitted between at least one source address and at least one destination address; and
 evaluate said query against each of said rules associated with each gateway node in said gateway-zone graph that is encountered between said at least one source address and said at least one destination address.

20. The tool of claim 19, wherein said rules are expressed as rule-base objects.

21. The tool of claim 19, wherein said gateway-zone graph is derived from a network topology file.

22. The tool of claim 19, wherein said query includes a wildcard for at least one of said service, source address or destination address.

23. The tool of claim 19, further comprising the step of determining a portion of said one or more given services that are permitted between at least one source address and at least one destination address.

24. The tool of claim 19, further comprising the step of transforming said packet filtering configuration files into a table of logical rules that are processed during said evaluating step.

25. The tool of claim 19, wherein said query consists of a source host-group, group, a destination host-group, and a service host-group.

26. The tool of claim 19, wherein said query specifies a location where packets are to be inserted into the network that is different from a source address.

27. A computer readable medium having computer readable program code means embodied thereon, said computer readable program code means analyzing at least one gateway in a network, said at least one gateway having a packet filtering configuration file including a plurality of rules, said network having a plurality of addresses, said computer readable program code means comprising:
 a step to generate a gateway-zone graph that models said network based on said packet filtering configuration file, said gateway-zone graph having at least one gateway node corresponding to said at least one gateway and at least two zone nodes, wherein said at least one gateway is a packet filtering machine and each of said zone nodes correspond to a partitioned collection of said addresses created by said at least one gateway;
 a step to receive a query inquiring whether one or more given services are permitted between at least one source address and at least one destination address; and
 a step to evaluate said query against each of said rules associated with each gateway node in said gateway-zone graph that is encountered between said at least one source address and said at least one destination address.

28. A system for modeling a network, comprising:
a memory for storing computer readable code; and
a processor operatively coupled to said memory, said processor configured to:
identify each gateway device in said network having a packet-filtering rule-base and each zone in said network defined by said gateway devices; and
generate a gateway-zone graph that models said network based on said packet-filtering rule-base, said gateway-zone graph having a gateway node corresponding to each of said gateway devices and a zone node corresponding to each of said zones.

29. A computer readable medium having computer readable program code means embodied thereon, said computer readable program code means comprising:
a step to identify each gateway device in a network having a packet-filtering rule-base and each zone in said network defined by said gateway devices; and
a step to generate a gateway-zone graph that models said network based on said packet-filtering rule-base, said gateway-zone graph having a gateway node corresponding to each of said gateway devices and a zone node corresponding to each of said zones.

* * * * *

UNITED STATES PATENT AND TRADEMARK OFFICE
CERTIFICATE OF CORRECTION

PATENT NO. : 7,016,980 B1
APPLICATION NO. : 09/483876
DATED : March 21, 2006
INVENTOR(S) : Mayer et al.

It is certified that error appears in the above-identified patent and that said Letters Patent is hereby corrected as shown below:

In column 5, line 39, of the specification, the phrase "Firewall Terminology and Modeling Concepts" should be a heading on a line by itself, and the text beginning with the word "Typically" should be its own paragraph beginning on the following line.

In column 7, line 54, of the specification, the word "Naming" should be a heading on a line by itself, and the text beginning with the word "In the model used" should be its own paragraph beginning on the following line.

In column 12, line 67, of the specification, replace " $arrow = l \| \rightarrow \| \leftrightarrow$ " with -- $arrow = \leftarrow \| \rightarrow \| \leftrightarrow$ --.

In column 16, line 43, of the specification, before "a destination host-group" and after "source host-group," delete -- group, --.

Signed and Sealed this

Eighth Day of August, 2006

JON W. DUDAS
*Director of the United States Patent and Trademark Office*